United States Patent [19]

Wakayama et al.

[11] Patent Number: 5,006,374

[45] Date of Patent: Apr. 9, 1991

[54] METHOD OF FORMING THIN ORGANIC FILMS

[75] Inventors: Shigeru Wakayama, Yokohama; Akira Miura, Toride, both of Japan

[73] Assignee: Kabushiki Kaisha Toshiba, Kawasaki, Japan

[21] Appl. No.: 354,354

[22] Filed: May 19, 1989

Related U.S. Application Data

[63] Continuation-in-part of Ser. No. 126,929, Nov. 30, 1987, Pat. No. 4,848,270.

[30] Foreign Application Priority Data

Dec. 2, 1986 [JP] Japan .................................. 61-287124
Dec. 26, 1986 [JP] Japan .................................. 61-308274

[51] Int. Cl.$^5$ ............................................. B05D 1/20
[52] U.S. Cl. ............................... 427/430.1; 427/434.3; 118/402
[58] Field of Search .................. 427/430.1, 434.3, 402; 118/402

[56] References Cited

U.S. PATENT DOCUMENTS 4,511,604 4/1985 Barraud ............................... 427/402

OTHER PUBLICATIONS

Fukuda, Monolayers and Multilayers of Anthraquinone Derivatives Containing Long Alkyl Chains, Journal of Colloid and Interface Science, vol. 54, No. 3, Mar. 1976.

*Primary Examiner*—Shrive Beck
*Attorney, Agent, or Firm*—Oblon, Spivak, McClelland, Maier & Neustadt

[57] ABSTRACT

An apparatus for forming thin organic films includes a plurality of water tanks each containing water. Monomolecular films of different amphiphatic organic molecules are developed on the surface of the liquid in water tanks, respectively. A work is dipped into and drawn up from a desired water tank, by a driving device, in a direction substantially perpendicular to the liquid surface, so that the monomolecular film in the water tank is adhered on a work surface. The work is transported by a transporting device to a position above another water tank, through an area lying above the water tanks. Then, the work is dipped into and drawn up from the other water tank, by the driving device, in a direction substantially perpendicular to the monomolecular film, so that another monomolecular film is adhered on the monomolecular film already formed on the work surface.

17 Claims, 12 Drawing Sheets

| FIG. 6B | FIG. 6E | FIG. 6H |
|---|---|---|

| FIG. 6C | FIG. 6F | FIG. 6I |
|---|---|---|

| FIG. 6D | FIG. 6G | FIG. 6J |
|---|---|---|

METHOD OF FORMING THIN ORGANIC FILMS

CROSS-REFERENCE TO RELATED APPLICATION

This application is a continuation-in-part of application Ser. No. 126,929, filed on Nov. 30, 1987 now U.S. Pat. No. 4,848,270.

BACKGROUND OF THE INVENTION

The present Invention relates to a method of forming a thin organic film, especially a heterostructural film obtained by building up a plurality of types of thin organic films.

Recent developments in material techniques using organic molecules are significant. Demand has arisen for a new functional element to be realized, using organic molecules. In particular, elements utilizing an ultra thin film using organic molecules have been widely researched.

Examples of a conventional method of forming a thin organic film are a spin coating method, a vapor deposition method, and a Langmuir-Brodgett method. The Langmuir-Brodgett method in particular has attracted a great deal of attention, being the one and only thin film forming method which is currently capable of orientating organic molecules in units of A and building them up. In the following description, the Langmuir-Brodgett method will be referred to as the LB method, and a film formed by this method will be referred to as an LB film. Examples of an element to which the LB film may be applied are a MIS light-emitting element or a MIS transistor using the LB film as an insulating film; a photoelectric conversion element, an optical recording medium, and a variety of sensors using dye molecules: and a piezoelectric element having a polarized film structure. In addition, research has been carried out with the aim of utilizing the LB film as an ultra micropatterning resist.

Using the LB method, amphiphatic monomolecules are developed on a water surface and then compressed to obtain a predetermined surface pressure, thereby forming a condensed film. Thereafter, a sample substrate is moved vertically across the monomolecular film, to coat a thin organic molecular film thereon. This technique is known as a vertical dipping method. On the other hand, a method in which a sample substrate is brought into contact parallel to a developed monomolecular film, in order for a thin organic molecular film to be coated on the substrate, is known as a horizontal adhering method. A structure of a stacked monomolecular film obtained by the above methods has three types, i.e., a Y-type, in which hydrophilic groups or hydrophobic groups are adjacent to each other, and X- and Z-types, in which the hydrophobic group is adjacent to the hydrophilic group. The X- and Z-types are changed in accordance with the hydrophilic or hydrophobic property of the substrate surface. In the Z-type, a hydrophilic group of a monomolecular film adhered first is in contact with the substrate surface, and monomolecular films are sequentially stacked such that a hydrophilic group of a second monomolecular film is adhered to a hydrophobic group of the first monomolecular film, and so on. In contrast, in the X-type, a hydrophobic group of a monomolecular film is in contact with the substrate surface, and monomolecular films are sequentially stacked such that a hydrophobic group of a second monomolecular film is adhered to a hydrophilic group of the first monomolecular film, and so on.

However, according to either of the above methods, only a stacked monomolecular film consisting of a single component can be obtained. As a result, its field of application is limited. For this reason, an increasing amount of research is being carried out with the aim of developing a method of forming an alternate built-up film (heterostructural film) consisting of different types of molecules. In order to stack a plurality of types of organic molecular films on top of one another, it is necessary to develop different organic molecular films in different regions of a water tank and dip a sample substrate sequentially in the different regions where the different monomolecular films are developed. In any of the conventional alternate built-up filmforming apparatuses, a single water tank is partitioned by fixed barriers, to enable development of a plurality of types of monomolecular films. In this case, lower portions of the respective organic molecular film developing regions partitioned by the fixed barriers communicate with each other, and water is commonly used in all the developing regions. However, use of such a conventional alternate built-up film formation apparatus poses the following problems:

First, in order to develop a monomolecular film, the water phases (e.g., pH, temperature, and ion concentration) of the respective developing regions must be set to optimal values, in accordance with the organic molecules. However, where a common water tank is used, different pH values or temperatures cannot be set in the developing regions of each of the different monomolecular films. As a result, the range of different molecules which can be developed is limited. Moreover, in order to transport a sample substrate between the developing regions of the different monomolecular films, the following arrangements have been proposed:

(a) An arrangement in which a fixed barrier is formed by use of a flexible material, and a gate is provided at the fixed barrier so that a sample substrate support rod can pass therethrough; and (b) an arrangement in which a fixed barrier is used as a rotating shaft and the sample substrate is supported by and rotated thereabout.

However, in the case of arrangement (a), if the sample substrate is transported through the gate, developed molecules will mix with each other or the surface pressure of the molecular films varies. This makes it difficult to form a good heterostructural film. Also, in the above two arrangements, the number of types of alternate built-up film is limited to two, i.e., three or more types of monomolecular films cannot be stacked. Furthermore, in these conventional apparatuses, the sample substrate must be transported inside the water tank. Therefore, there is danger that the thin organic film adhered on the substrate may be removed therefrom by water resistance.

In addition, since both of the above film formation methods are based on use of the vertical dipping method, only the Y-type hetero built-up film (in which hydrophilic groups or hydrophobic groups are adjacent to each other) can be obtained. For this reason, the above methods cannot sufficiently cope with the formation of a variety of films including other types of films required to develop a functional element which positively utilizes an interaction between different molecules. As has been described above, formation of a good hetero builtup film consisting of a plurality of types of molecules according to the conventional methods poses a number of problems in practice, and its application range is significantly limited.

SUMMARY OF THE INVENTION

The present invention has been developed in consideration of the above situation, and has as its object to provide a thin organic film formation method of forming a good thin organic film.

In order to achieve the above object, a formation method according to the present invention comprises the steps of:

preparing a plurality of organic molecule developing regions partitioned from each other and each housing a liquid;

developing monomolecular films of different amphiphatic organic molecules on liquid surfaces of the developing regions, respectively;

dipping a work into and raising it out of one of the developing regions, in a direction substantially perpendicular to the monomolecular film, thereby adhering the monomolecular film on a work surface;

transporting said work, through an area outside the developing regions, to a position above another developing region, where another monomolecular film is developed; and dipping said work into and raising it out of said another developing region, in a direction substantially perpendicular to the monomolecular film, thereby adhering another monomolecular film on the monomolecular film already adhered on the work.

BRIEF DESCRIPTION OF THE DRAWINGS

FIGS. 1 to 7 show a thin organic film formation apparatus according to a first embodiment of the present invention, in which:

FIG. 1 is a partially cutaway perspective view of the apparatus;

FIG. 2 is a sectional view of a water tank;

FIG. 3 is a perspective view of a substrate drive mechanism of the apparatus;

FIG. 5 is a schematic view of a formed heterostructural film;

FIGS. 6A to 6J are schematic views showing another process of forming a thin organic film; and FIG. 7 is a schematic view of a thin organic film formed by the process shown in FIGS. 6A to 6J, and FIGS. 8 to 12 show a thin organic film formation apparatus according to a second embodiment of the present invention, in which:

DETAILED DESCRIPTION OF THE PREFERRED EMBODIMENTS

Embodiments of the present invention will now be described in detail, with reference to the accompanying drawings.

Figure 1:
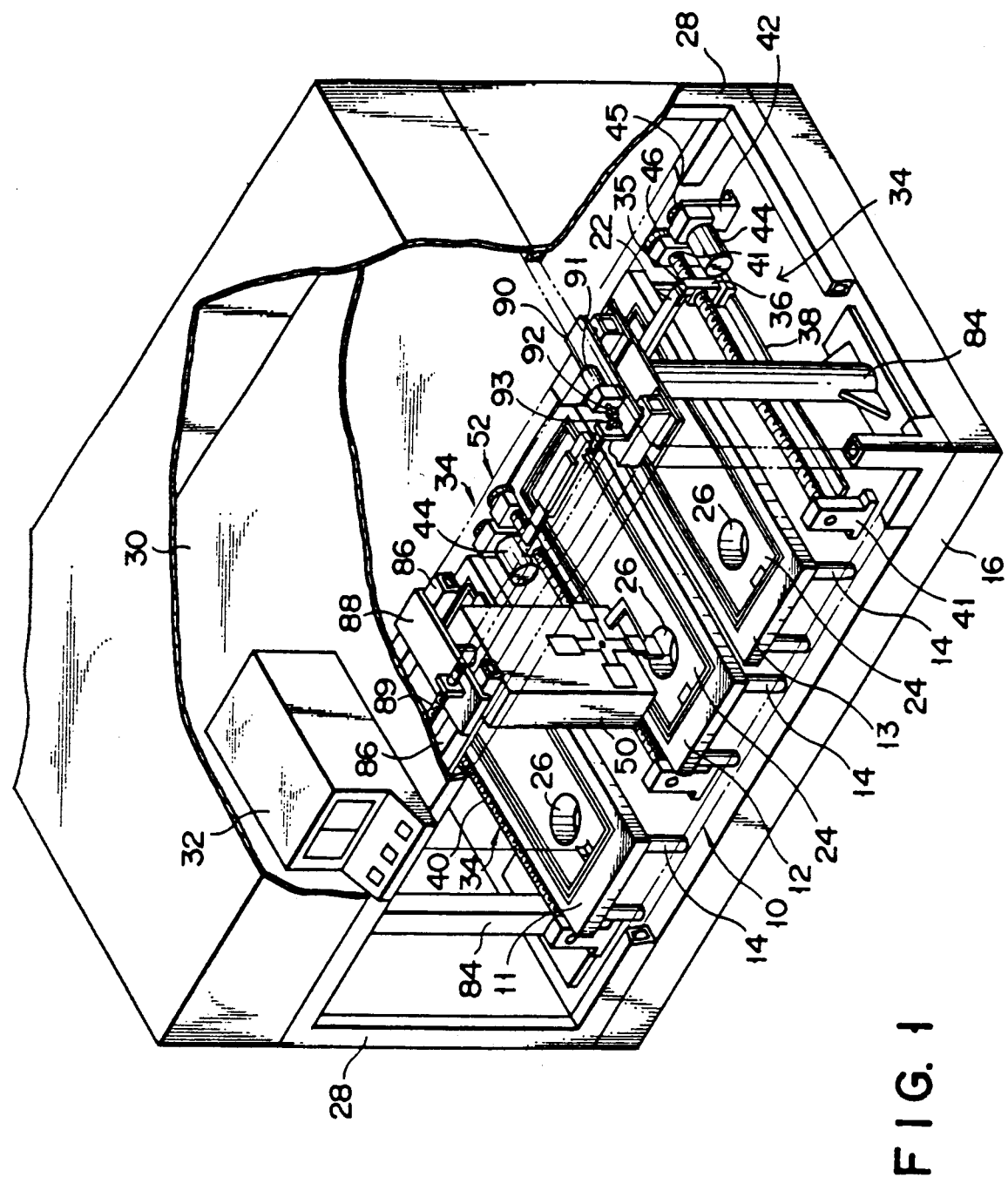

FIG. 1 shows a heterostructural film formation apparatus according to a first embodiment of the present invention. This apparatus comprises, as developing means 10, three independent water tanks, 11, 12, and 13 for developing three types of amphiphatic organic molecules. Each water tank is rectangular in shape. Tanks 11, 12, and 13 are arranged parallel with one another and are mounted horizontally fixed on vibration proof base 16 by support legs 14, respectively. One of the water tanks, for example, tank 11, will be described below.

Figure 2:
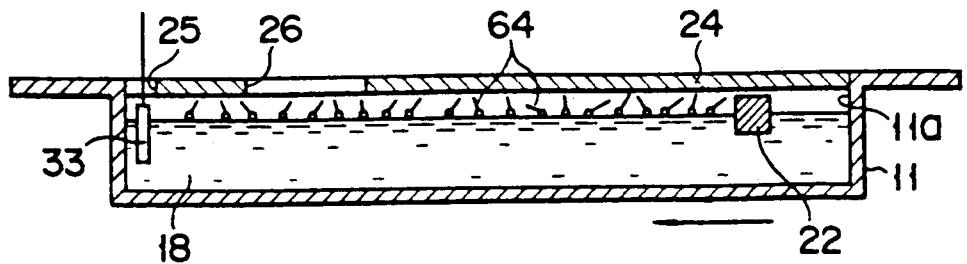

As is shown in FIG. 2, tank 11 contains liquid 18 (for example, water) having a liquid phase composition in which the pH, temperature, and ion concentration are set, at predetermined values, and on the surface of which desired organic molecules 64 are developed. Movable barrier 22 of a compression drive mechanism to be described later is provided on the liquid surface, to compress molecules 64 by a predetermined surface pressure, thereby to form a condensed film. Rectangular upper opening 11a of tank 11 is closed by cover 24. First and second insertion holes 25 and 26 are formed in cover 24. Note that the other tanks, 12 and 13, have the same arrangement as that of tank 11.

Support frame 28 is mounted on base 16 and supports upper plate 30, so that plate 30 is located above tanks 11, 12, and 13 and parallel to base 16. On plate 30 are provided three surface pressure detectors 32 for detecting the surface pressure of the monomolecular film developed on the liquid surface of liquid 18 in each of tanks 11, 12, and 13, respectively. Although only one detector 32 corresponding to tank 11 is shown in FIG. 1, detectors having the same arrangement as that of detector 32 are actually provided to correspond to tanks 12 and 13, respectively. As detector 32, a Wilhelmy-type detector using an electronic balance is used. According to this electronic balance, filter paper 33 is suspended in liquid 18 through first insertion hole 25 formed in cover 24 of the water tank, thereby measuring the surface tension of the molecular film developed on the liquid surface.

Three compression drive mechanisms 34 are independently arranged on base 16, to correspond to tanks 11, 12, and 13, respectively. Mechanism 34 corresponding to tank 13 will be described below.

Mechanism 34 comprises movable barrier 22, made of Teflon (PTFE composite material), for developing and compressing organic molecules on the surface of the liquid in the water tank. Rod-like barrier 22 extends across the entire width of tank 13. One end of barrier 22 is fixed to support base 36 through leaf spring 35. Support base 36 is slidably placed on guide rail 38 fixed on base 16 and is threadably engaged with feed screw 40. Both ends of screw 40 are rotatably supported by support posts 41 extending upright from base 16. Rail 38 and screw 40 extend parallel to each other and along the longitudinal direction of tank 13. The driving force of motor 44, supported by support post 42 fixed on base 16, is transmitted to screw 40 via gears 45 and 46. When screw 40 is rotated by motor 44, support base 36 is moved along rail 38. Therefore, as is indicated by the arrow in FIG. 2, barrier 22 moves on the liquid surface, to compress the organic molecules floating thereon toward the left side of the water tank, thereby forming a condensed molecular film having a predetermined surface pressure.

The other mechanisms 34, corresponding to tanks 11 and 12, have the same arrangement as described above. Note that in this embodiment, mechanisms 34 are located at the left side of tanks 11 and 12 and at the right side of tank 13, respectively. This arrangement is governed by considerations of housing space and may be changed as needed.

The film formation apparatus comprises substrate drive device 50 for vertically moving substrate 48, as a work on which films are formed, to dip it into and raise it out of the liquid in each water tank, and transport mechanism 52 for transporting drive device 50 along a path located above tanks 11, 12, and 13.

Figure 3:
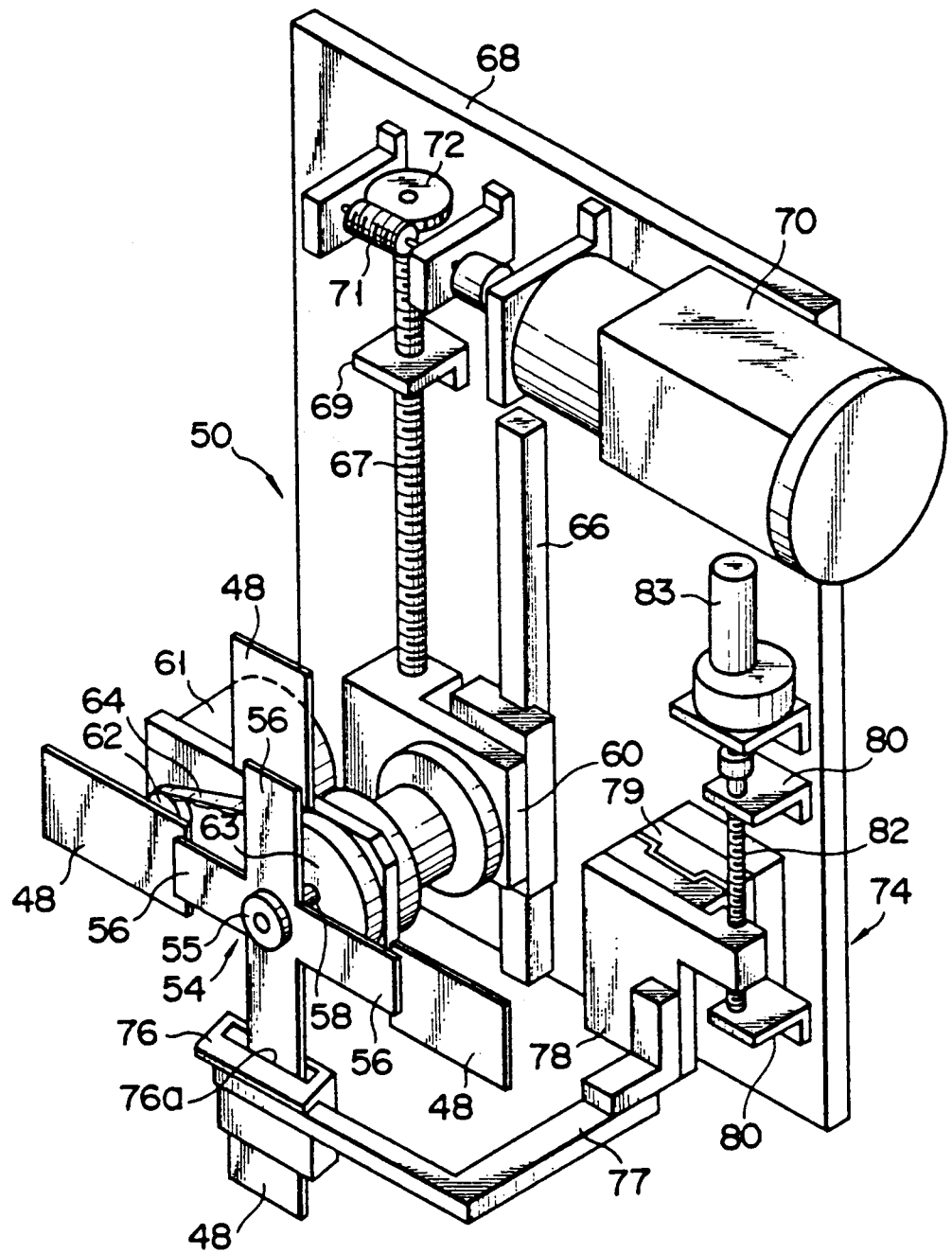

As is shown in detail in FIG. 3, device 50 has impeller-like substrate holder 54 capable of holding a plurality, for example, four, of substrates 48. Holder 54 includes central portion 55 and four arms 56 extending radially therefrom. Substrates 48 are held at the extending ends of arms 56 and located on a common circle. Each substrate 48 is held such that both surfaces thereof are perpendicular to the surface of the liquid in the water tanks. Central portion 55 of holder 54 is rotatably supported on support base 60 by rotating shaft 58. Motor 61 is supported on support base 60, and the driving force of motor 61 is transmitted to holder 54 via pulley 62 mounted on a rotating shaft of motor 61, pulley 63 mounted on shaft 58, and belt 64 extending between pulleys 62 and 63. Through rotating holder 54 by means of motor 61, a desired one of substrates 48 to be dipped in the water tanks is selected from among the four held by holder 54.

Support base 60 is slidably supported by guide rail 66 fixed to support board 68 and is threadably engaged with feed screw 67 mounted on board 68 by means of support posts 69. Rail 66 and screw 67 extend parallel to each other and perpendicularly to the surface of the liquid in the water tanks. Motor 70 is mounted on board 68, and the driving force thereof is transmitted to screw 67 via worm gear 71 mounted on a rotating shaft of motor 70 and gear 72 attached to screw 67. When screw 67 is rotated by motor 70, holder 54 is moved vertically, together with support base 60, along rail 66. When holder 54 is moved upward or downward, a chosen one of substrates 48 held thereby is dipped into or raised out of liquid 18 in a desired water tank, through second insertion hole 26 formed in cover 24 of the tank.

Partition device 74 is provided on board 68, and has partition cassette 76. When substrate 48 is dipped into or raised out of the liquid in the water tank, partition cassette 76 partitions a region, through which substrate 48 passes, of a molecular film developed on the liquid surface from other regions thereof, thereby preventing the molecular film from adhering on the substrate surface. Cassette 76 is formed of a rectangular cylinder. The cross-sectional area of inner hole 76a of the rectangular cylinder is slightly larger than that of substrate 48, so that substrate 48 can pass therethrough. Cassette 76 is supported on support base 78 by arm 77. Support base 78 is slidably mounted on guide rail 79 fixed to support board 68. Support base 78 is threadably engaged with feed screw 82 mounted on board 68. Rail 79 and screw 82 extend parallel to each other and perpendicularly to the liquid surface in the water tanks. Therefore, by rotating screw 82 by motor 83 mounted on board 68, cassette 76 is moved vertically together with support base 78 and independently from holder 54, so that it can be inserted into the water tank as needed through hole 26 formed in cover 24 of the tank.

Substrate drive device 50 and partition device 74 having the above arrangements can be transported above tanks 11, 12, and 13 by transport mechanism 52. Mechanism 52 includes a pair of posts 84 erected on end portions of base 16, and a pair of guide rails 86 are fixed between both upper ends of posts 84. Rails 86 extend horizontally above tanks 11, 12, and 13 and parallel to each other. Moving plate 88 is slidably placed on rails 86, and support board 68 on which devices 50 and 74 are mounted is suspended from plate 88. Plate 88 is engaged with feed screw 89. Screw 89 extends parallel to rails 86, and both end portions of screw 89 are supported on both ends of rails 86 by means of support plates 90. Motor 91 is fixed to one of plates 90, and screw 89 is rotated by motor 91 through gears 92 and 93. By driving screw 89, devices 50 and 74 can be moved between tanks 11, 12, and 13 along rails 86.

A process of forming a heterostructural film on the surface of substrate 48 using the formation apparatus having the above arrangement will be described. A variety of heterostructural films can be formed on the substrate surface in accordance with how substrate 48 is transported between tanks 11, 12, and 13 or how partition cassette 76 is used.

First, a process of forming a heterostructural film on the substrate surface by transporting substrate 48 sequentially through tanks 11, 12, and 13 in this order without using cassette 76 will be described. FIGS. 4A to 4J show how monomolecular films are built up on the surface of substrate 48 in the respective water tanks. Note that monomolecular films of organic molecules 94, 95, and 96 having different amphiphatic properties are developed on the liquid surfaces in tanks 11, 12, and 13.

Figure 4A:
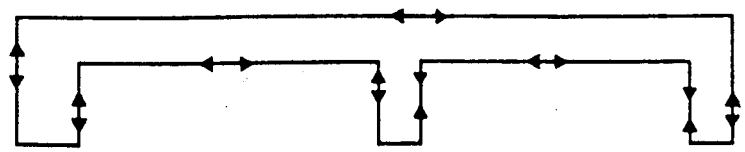
FIG. 4A is a schematic view showing a moving path of a substrate.
Figures 4B, 4E, 4H:
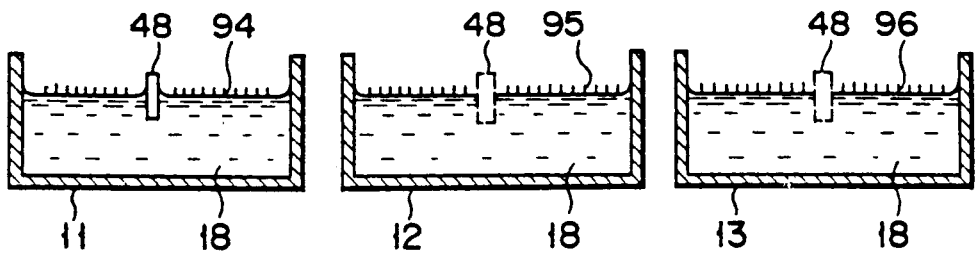
FIGS. 4B to 4J are schematic views showing a process of forming a thin organic film.
Figures 4C, 4F, 4I:
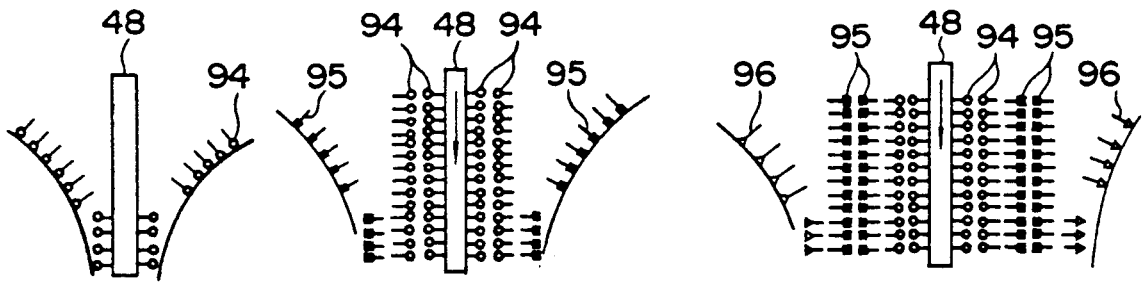
Figures 4D, 4G, 4J:
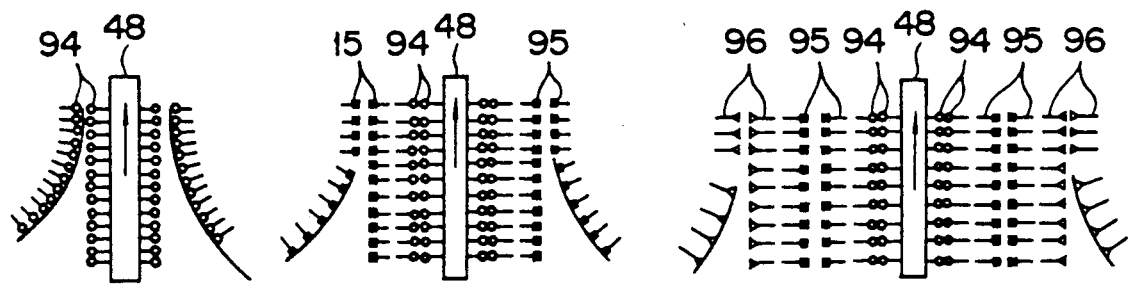

Substrate 48 is moved along a path shown in FIG. 4A. That is, substrate 48 is first transported to a position above tank 11 by transport unit 52. Subsequently, as is shown in FIGS. 4B and 4C, substrate 48 is moved downward by device 50 and dipped into liquid 18 in tank 11 through the monomolecular film. At this time, the monomolecular film is adhered on both surfaces of substrate 48 while the hydrophobic group side of molecule 94 is brought into contact with substrate 48. Then, as is shown in FIG. 4D, substrate 48 is pulled up from tank 11 by device 50. At this time, monomolecular films of molecules 94 are built up on both substrate surfaces while the hydrophilic group side of molecule 94 is adhered to the hydrophilic group of molecule 94 of the monomolecular film already formed on the substrate surface. Substrate 48 pulled up from tank 11 is transported to a position above tank 12. Then, as is shown in FIGS. 4E and 4F, substrate 48 is dipped into liquid 18 through the monomolecular film developed on the liquid surface in tank 12. At this time, monomolecular films of molecules 95 are built up on both surfaces of substrate 48 while the hydrophobic group of molecule 95 is brought into contact with the hydrophobic group of molecule 94 of the monomolecular film already formed on the substrate surface. Subsequently, as is shown in FIG. 4G, substrate 48 is pulled up above tank 12. At this time, monomolecular films of molecules 95 are built up on both surfaces of substrate 48 so that the hydrophilic group of molecule 95 is brought into contact with that of molecule 95 of the monomolecular film already formed. Then, substrate 48 is transported to a position above tank 13 by mechanism 52, and as is shown in FIGS. 4H to 4J, substrate 48 is dipped in and pulled up from liquid 18 in tank 13 through the monomolecular film developed on the liquid surface. In the dipping step (FIG. 4I) and pull-up step (FIG. 4J), the monomolecular film of molecules 96 are built up on both surfaces of substrate 48 as in the steps performed in tank 12.

Figure 5:
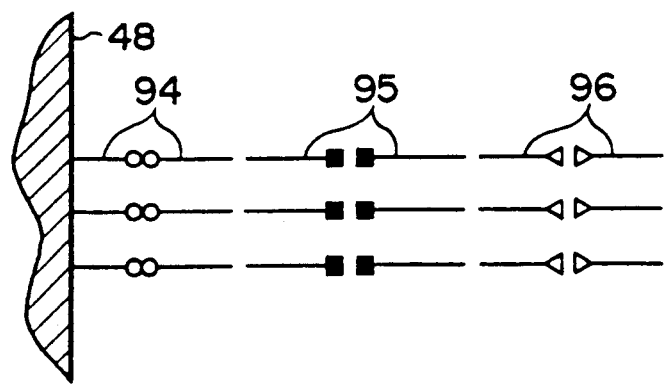

FIG. 5 is an enlarged schematic view of a heterostructural film built up by the above steps.

Figure 6A:
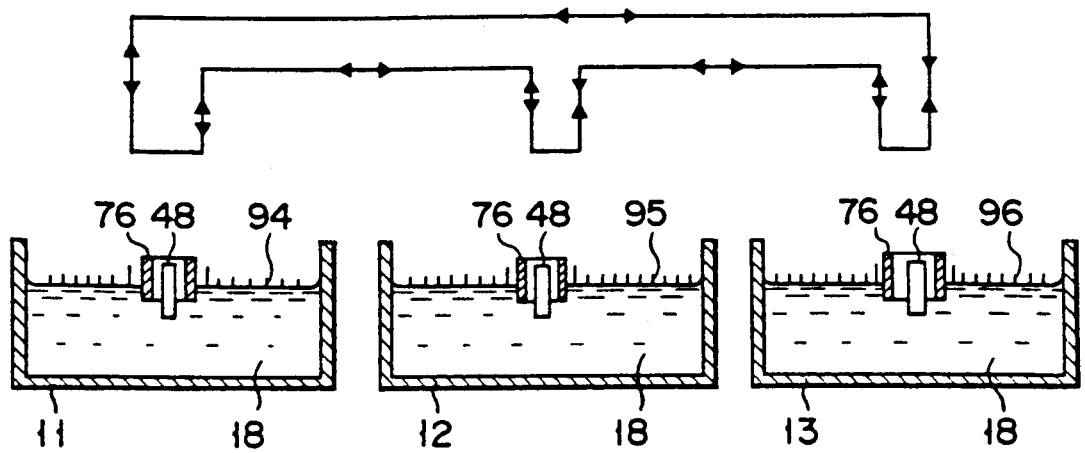
Figure 6A:
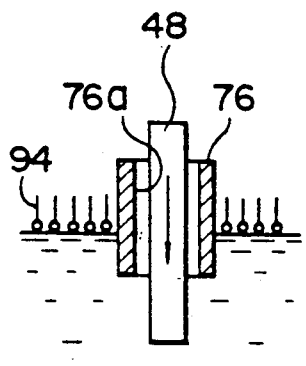
Figure 6A:
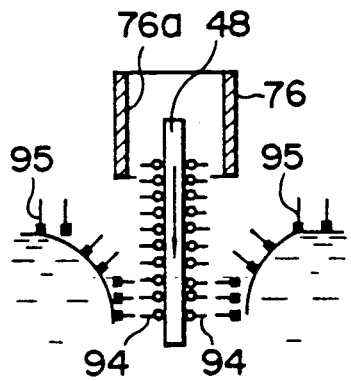
Figure 6A:
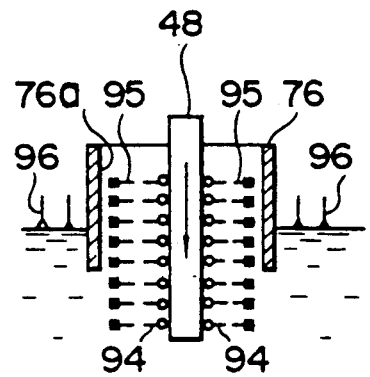
Figure 6A:
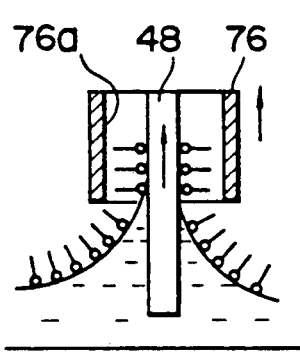
Figure 6A:
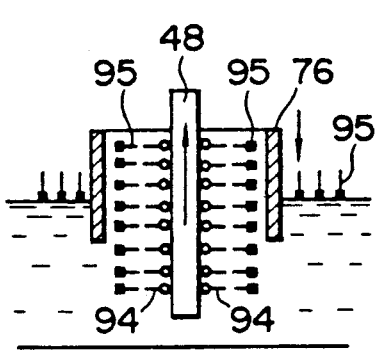
Figure 6A:
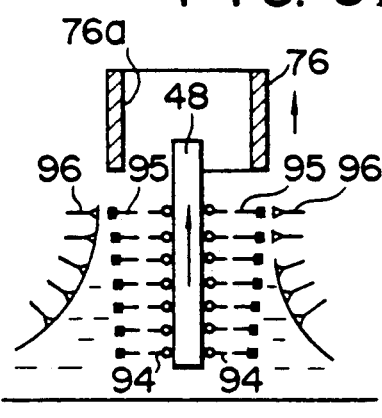

A process of forming a desired heterostructural film using partition cassette 76 will be described. FIGS. 6A to 6J show how monomolecular films are built up when cassette 76 is used. As is shown in FIG. 6A, substrate 48 is sequentially dipped in and pulled up from tanks 11, 12, and 13 in this order by drive device 50 and transport mechanism 52.

First, substrate 48 and cassette 76 are transported to a position above tank 11 by mechanism 52. At this time, substrate 48, on which monomolecular films are to be formed, is inserted into inner hole 76a of cassette 76. Subsequently, as is shown in FIGS. 6B and 6C, only cassette 76 is moved downward, and substantially a half thereof is dipped in liquid 18 in tank 11 and held therein. Therefore, of the monomolecular film of molecules 94 developed on the liquid surface of liquid 18, a region through which substrate 48 passes is partitioned from other regions by cassette 76. In this state, substrate 48 is dipped in liquid 18 through hole 76a of cassette 76 and the partitioned region. Since the monomolecular film developed on the liquid surface is partitioned by cassette 76, molecules 94 are not adhered on the surfaces of substrate 48. Actually, molecules in the region partitioned by cassette 76 are adhered on substrate 48. However, since an area of the partitioned region is much smaller than that of the substrate surfaces, molecules are slightly adhered on an end portion of the substrate and hence is negligible.

Subsequently, as is shown in FIG. 6D, only cassette 76 is pulled up from tank 11. As a result, the partitioned region is opened, and a monomolecular film is developed also on the region through which substrate 48 passes. In this state, substrate 48 is pulled up above tank 11 through the monomolecular film. Therefore, monomolecular films of molecules 94 are formed on both surfaces of substrate 48 while the hydrophilic group to molecule 94 is brought into contact with the substrate. Pulled-up cassette 76 and substrate 48 are transported to a position above tank 12 by mechanism 52. Then, as is shown in FIGS. 6E and 6F, substrate 48 is dipped in tank 12 while cassette 76 is held above tank 12. Therefore, monomolecular films of molecules 95 are built up on both surfaces of substrate 48 while the hydrophobic group of molecule 95 developed in tank 12 is brought into contact with that of molecule 94 of the monomolecular films already formed on the substrate. While substrate 48 is dipped in liquid 18, cassette 76 is then moved downward and substantially a half thereof is dipped in liquid 18. Therefore, of the monomolecular film developed on the liquid surface, a region through which substrate 48 passes is partitioned from other regions. Thereafter, while cassette 76 is held in liquid 18, substrate 48 is pulled up from tank 12 through hole 76a of cassette 76 and the partitioned region. At this time, no monomolecular film is adhered on the surfaces of substrate 48 because of an effect of cassette 76. Then, cassette 76 is pulled up from tank 12.

Pulled-up cassette 76 and substrate 48 are transported to a position above tank 13 by mechanism 52. Then, as is shown in FIGS. 6H and 6I, cassette 76 is moved downward into tank 13, and substantially a half thereof is dipped in liquid 18. Thereafter, substrate 48 is dipped in the liquid through hole 76a of the cassette. At this time, the monomolecular film of molecules 96 developed on the liquid surface is not adhered on the surfaces of substrate 48. Subsequently, as is shown in FIG. 6J, after cassette 76 is pulled up from tank 13, substrate 48 is pulled up therefrom through the monomolecular film. Therefore, monomolecular films of molecules 96 are built up on both surface of substrate 48.

Figure 7:
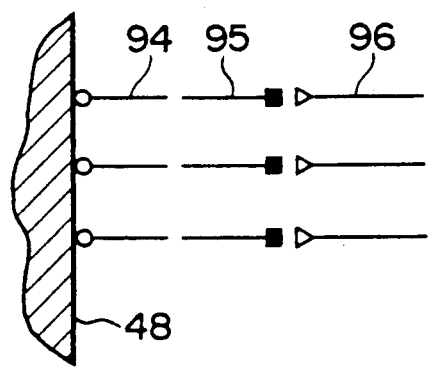

FIG. 7 is an enlarged schematic view of an arrangement of the heterostructural film built up by the above steps. As is apparent from FIG. 7, by arbitrarily combining cassette 76 with a vertical movement of substrate 48, a given monomolecular film can be built up in a desired direction.

Note that as described above, when the region through which the substrate passes is partitioned by cassette 76, molecules present in the partitioned region are slightly adhered on the substrate. In order to prevent this adhesion of molecules, a dummy substrate may be mounted on holder 54. That is, in this case, the dummy substrate is dipped in and pulled up from the liquid through the region partitioned by cassette 76 so that molecules in the partitioned region are adhered on the dummy substrate. Thereafter, substrate 48 is dipped in and pulled up from the liquid through the partitioned region. Therefore, molecules are not unnecessarily built up on the end of the substrate when cassette 76 is used.

According to the formation method and apparatus having the above arrangement, a plurality of water tanks each housing organic molecules are provided independently of each other, and when a substrate is to be transported between the water tanks, the substrate is taken out from the water tank and then is transported. Therefore, during transportation of the substrate, molecules in one of the water tanks do not mix with molecules in another water tank, thereby preventing contamination of the water tank. In addition, unlike in a conventional method wherein a substrate is transported through the inside of water tanks, monomolecular films adhered on the substrate surfaces are not removed therefrom by a water pressure or the like. Moreover, since the water tanks are provided independently of each other, a phase composition of a liquid in each water tank can be optimally set in accordance with the type of organic molecules to be developed, thereby widening a selection range of molecules to be developed. For the above reasons, a good heterostructural film can be formed.

In addition, by using the partition cassette in combination with the substrate drive device, heterostructural films which cannot be obtained without the partition cassette can be formed. That is, monomolecular films can be selectively built up only when the substrate is dipped in or pulled up from the liquid. As a result, different monomolecular films can be stacked one by one, and stacking directions thereof can be arbitrarily selected. Therefore, a variety of heterostructural films can be formed.

A formation apparatus according to a second embodiment of the present invention will be described.

Figure 8:
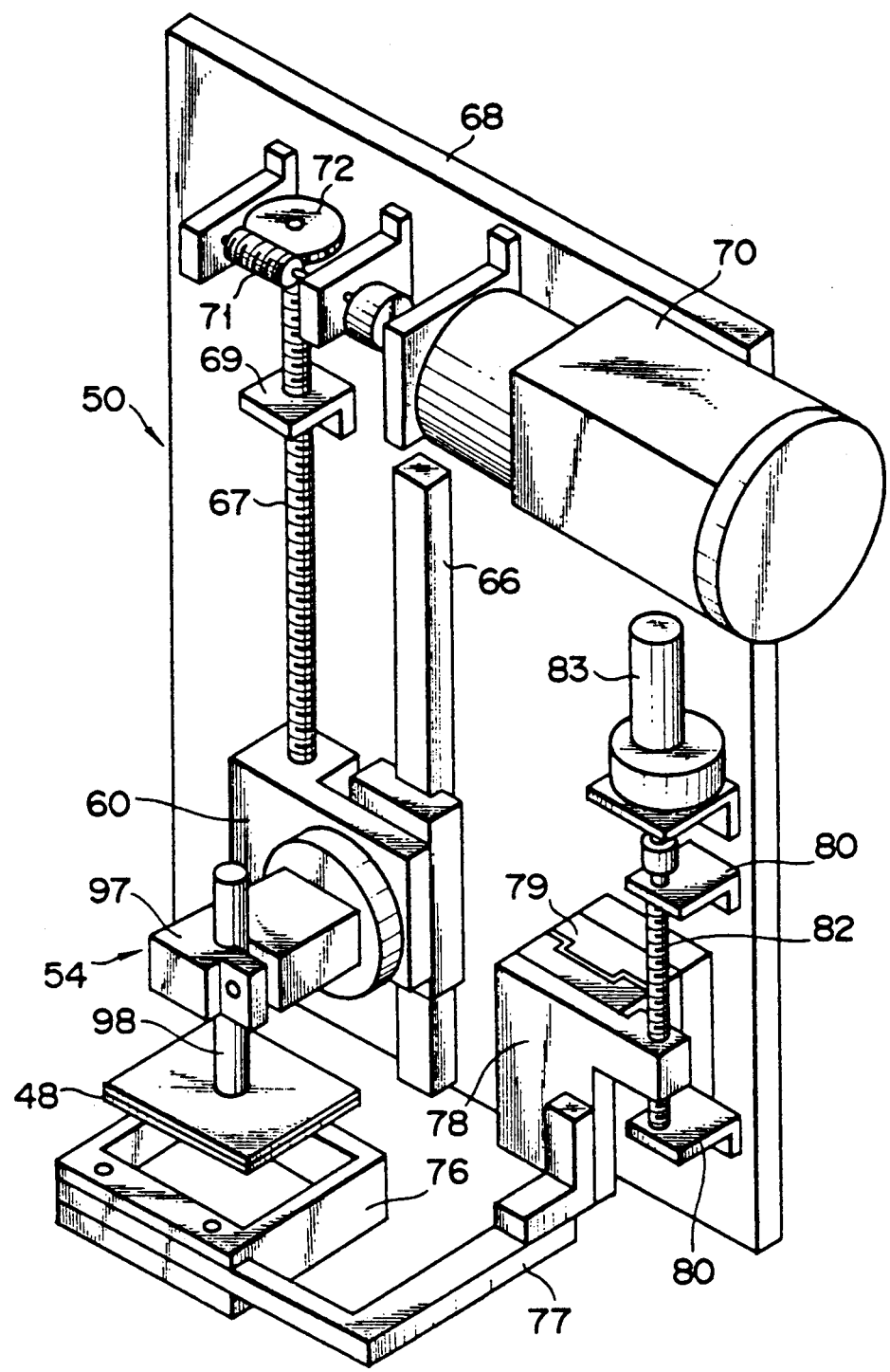
FIG. 8 is a perspective view of a substrate drive mechanism of the apparatus.

An arrangement of the second embodiment is the same as that of the first embodiment except for an arrangement of the substrate holder and a shape of the partition cassette. In FIG. 8 showing the second embodiment, the same parts as in the first embodiment are denoted by the same reference numerals, and a detailed description thereof will be omitted.

As shown in FIG. 8, substrate holder 54 has main body 97 supported by support base 60, and vertical holding rod 98 supported by the main body. In the second embodiment, substrate 48 is fixed to a lower end of rod 98 so that the surfaces thereof are parallel to the liquid surface in the water tanks. Partition cassette 76 is formed of a rectangular cylinder. Inner hole 76a of the rectangular cylinder has the same shape as that of the surfaces of substrate 48 and a crosssectional area slightly larger than that of the substrate surfaces.

A process of forming a heterostructural film on the surface of substrate 48 without using cassette 76 by the above apparatus will be described. Note that in water tanks 11, 12, and 13, monomolecular films of different organic molecules 94, 95, and 96 having amphiphatic properties are developed by a predetermined surface pressure, respectively.

Figure 9A:
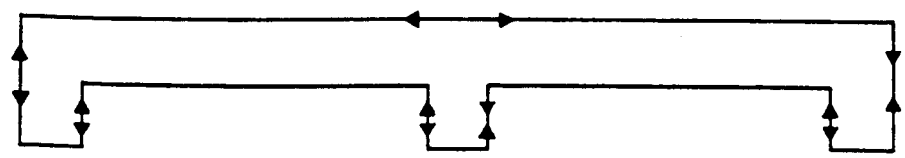
FIGS. 9A to 9G are schematic views showing a process of forming a thin organic film, using the apparatus.
Figure 9B:
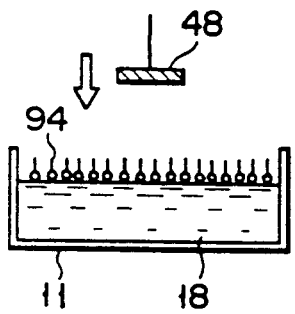
Figure 9D:
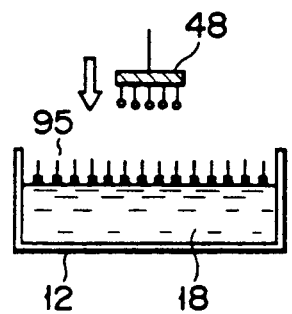
Figure 9F:
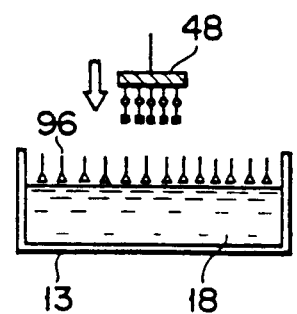
Figure 9C:
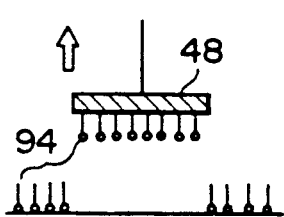
Figure 9E:
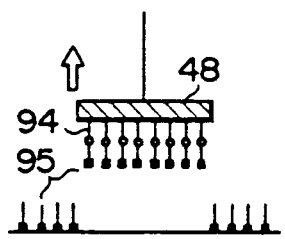
Figure 9G:
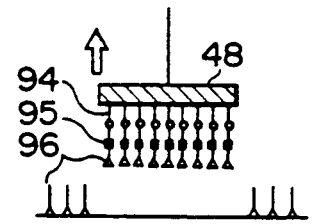

Substrate 48 is moved along a path shown in FIG. 9A. That is, substrate 48 is first transported to a position above tank 11 by the transport mechanism. Subsequently, as is shown in FIGS. 9B and 9C, substrate 48 is moved downward by drive device 50 until its lower surface is brought into contact with the monomolecular film developed in tank 11, and then is pulled up above tank 11. At this time, the monomolecular film of molecules 94 is adhered on the lower surface of substrate 48 while the hydrophobic group side of molecule 94 is brought into contact with the substrate. Then, as is shown in FIGS. 9D and 9E, substrate 48 is transported to a position above tank 12 and moved downward until its lower surface is brought into contact with the monomolecular film of molecules 95 developed in tank 12. Thereafter, substrate 48 is pulled up above tank 12. At this time, the monomolecular film of molecules 95 is built up on the lower surface of substrate 48 while the hydrophobic group of molecule 95 is adhered to the hydrophilic group of molecule 94 of the monomolecular film already formed on the substrate. Subsequently, substrate 48 is transported to a position above tank 13. Thereafter, as is shown in FIGS. 9F and 9G, substrate 48 is moved downward until the lower surface is brought into contact with the monomolecular film of molecules 96 developed in tank 13 and then is pulled up above tank 13. At this time, the monomolecular film of molecules 96 is built up on the lower surface of substrate 48 while the hydrophobic group of molecule 96 is adhered to the hydrophilic group of molecule 95 of the monomolecular film already formed on the substrate.

Figure 10A:
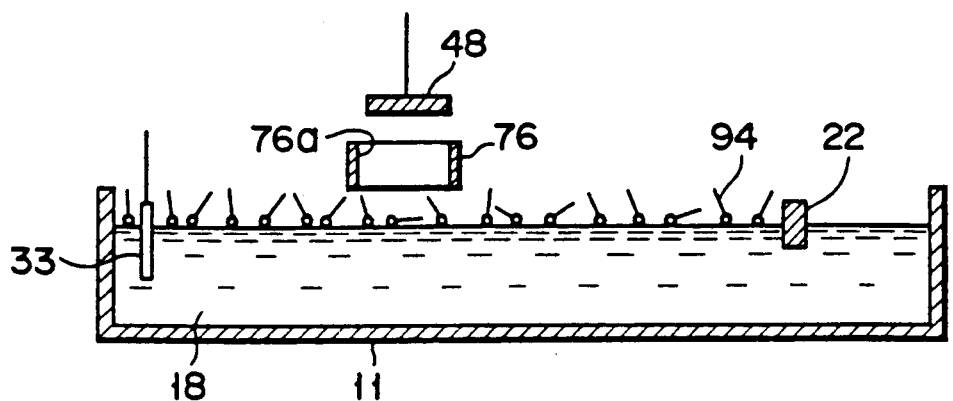
FIGS. 10A to 10C are schematic views showing a process of partitioning a monomolecular film, using a partition cassette.
Figure 10B:
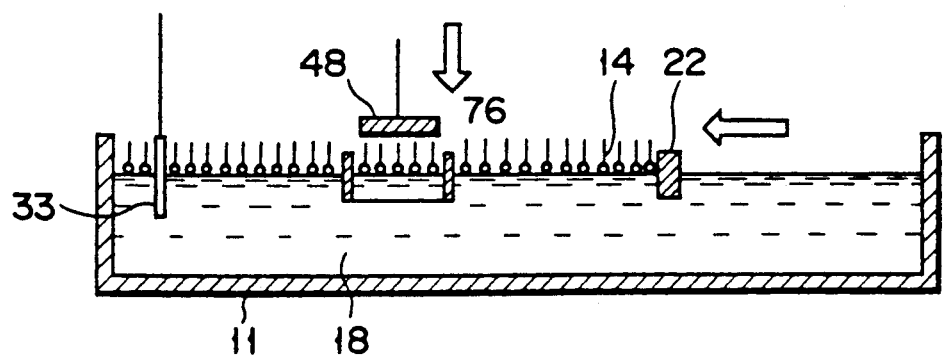
Figure 10C:
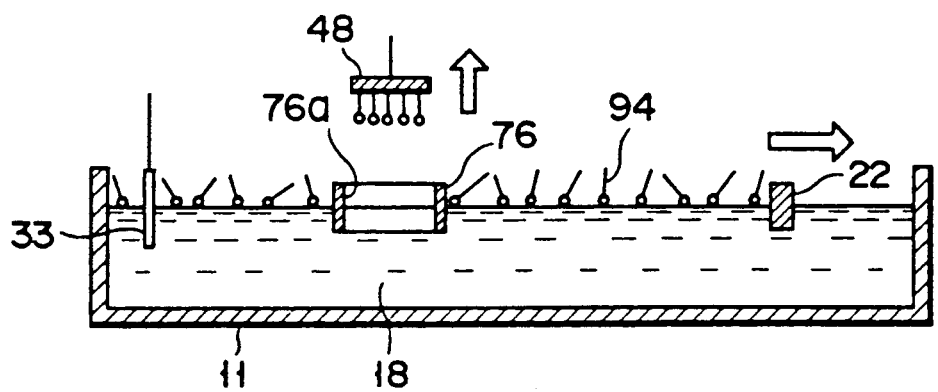
Figure 11A:
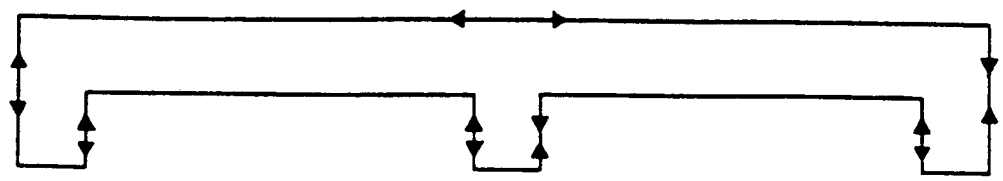
FIGS. 11A to 11G are schematic views showing another process of forming a thin organic film, using the apparatus.
Figures 11B, 11D, 11F:
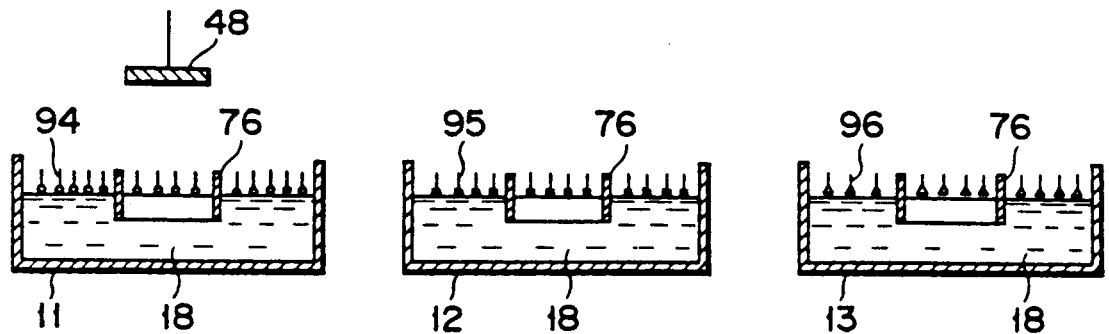
Figures 11C, 11E, 11G:
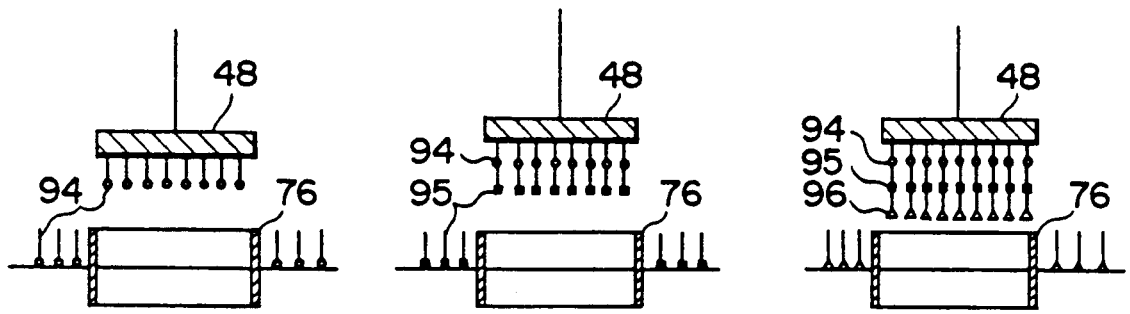
Figure 12:
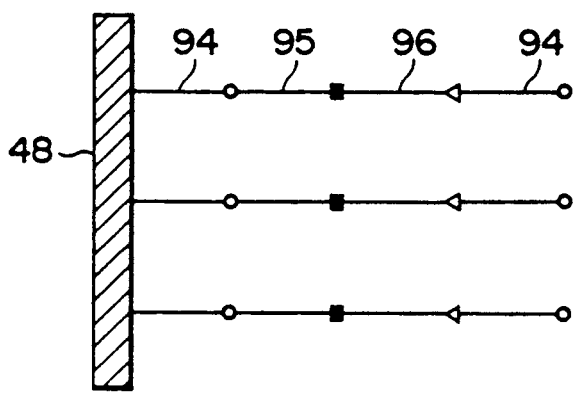
FIG. 12 is a schematic view of a thin organic film formed by the process shown in FIGS. 11A to 11G.

A process of forming a heterostructural film using cassette 76 will be described with reference to the case wherein tank 11 is used. First, as is shown in FIG. 10A, before substrate 48 and cassette 76 are moved downward, molecules 94 developed on the liquid surface of liquid 18 are not condensed to have a predetermined surface pressure. Subsequently, as is shown in FIG. 10B, movable barrier 22 is driven in an arrow direction to form a condensed film of molecules 94 having a predetermined surface pressure. Note that the surface pressure of the condensed film is detected by detector 32 (FIG. 1) through filter paper 33. Then, cassette 76 is moved downward to a position where substantially a half thereof is dipped in liquid 18. As a result, a region of the condensed film, corresponding to an area of substrate 48 to be dipped in the liquid, is partitioned from other regions. In this state, substrate 48 is moved downward until its lower surface is brought into contact with the condensed film through hole of cassette 76. Thereafter, as is shown in FIG. 10C, substrate 48 is pulled up from tank 11. Therefore, a monomolecular film is formed on the lower surface of substrate 48. Thereafter, barrier 22 is moved in the arrow direction to reduce the surface pressure of the developed monomolecular film below a predetermined value, and then cassette 76 is pulled up from tank 11.

In this case, the reason why cassette 76 is pulled up after the surface pressure of the monomolecular film is reduced below a predetermined value is as follows. For example, if cassette 76 is pulled up without reducing the surface pressure of the monomolecular film, a region where no monomolecular film is present is produced. In this case, since the surface pressure of the monomolecular film is high, molecules around the region abruptly flow therein. As a result, the molecules may be destroyed.

Thereafter, in order to build up monomolecular films of the same type on substrate 48, steps shown in FIGS. 10A to 10C are repeated. In order to build up monomolecular films of different types on substrate 48, e.g., when substrate 48 is transported between tanks 11, 12, and 13 in the order named so as to build up monomolecular films respectively developed in the water tanks on the substrate, the steps shown in FIGS. 10A to 10C are performed for each water tank as is shown in FIGS. 11A to 11G. As a result, monomolecular films of different types are built up on the surface of substrate 48 in a stacking direction while every hydrophilic group of the monomolecular film contacts the hydrophobic groups of the adjacent monomolecular film.

According to the second embodiment having the above arrangement, similar to the first embodiment, mixing and contamination of different molecules and removal of a monomolecular film from the substrate during transportation thereof can be prevented. In the first embodiment, although monomolecular films can be simultaneously formed on both surfaces of the substrate, the substrate must be dipped in and pulled up from the liquid at a speed as very low as about 0.3 mm/min, thereby increasing a time required for forming a film. However, according to the second embodiment, since the substrate is vertically moved so that its surface is horizontally arranged, a film can be formed on its entire lower surface in a short time period. Thus, the second embodiment is suitable for mass production.

In addition, by using the partition cassette in combination with the substrate drive device, only molecules in a region partitioned by the cassette, i.e., molecules in an area corresponding to a surface area of the substrate can be adhered on the substrate. That is, when the substrate is pulled up, an unnecessary monomolecular film developed around the substrate is not adhered thereon, thereby preventing a problem such that a film formed on a portion close to the peripheral edge of the substrate becomes a double layer. Therefore, a uniform heterostructural film can be formed. Moreover, by using the cassette, the surface pressure of the monomolecular film developed in the water tank can be reduced after the monomolecular film is adhered on the substrate. As a result, destruction of molecules can be prevented when the substrate is pulled up.

Figure 13:
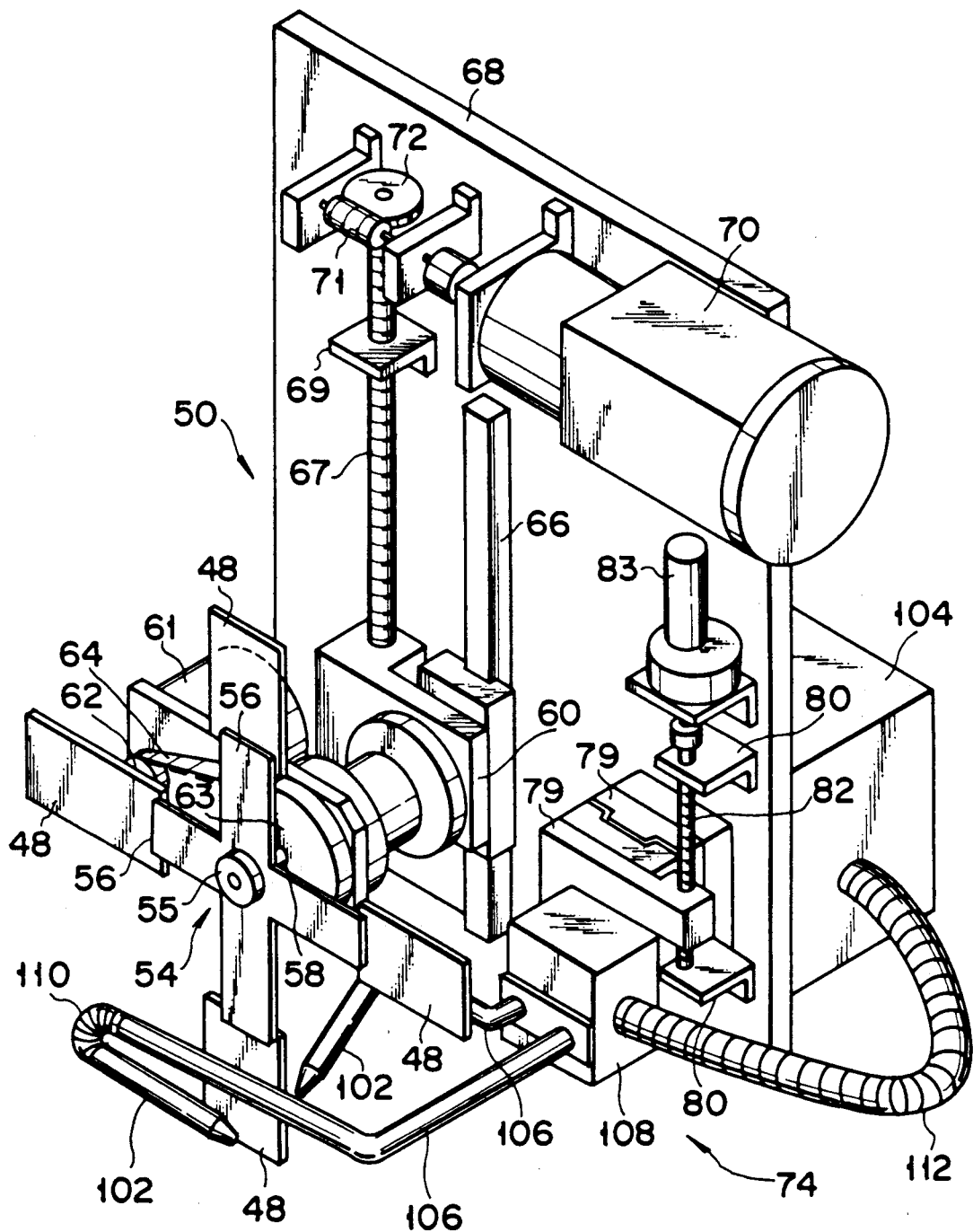
FIG. 13 is a perspective view showing a thin organic film formation apparatus according to a third embodiment of the present invention.

FIG. 13 shows a forming apparatus according to a third embodiment of the present invention. The third embodiment is constructed in the same manner as the aforementioned first embodiment except the arrangement of partitioning device 74. In FIG. 13, like reference numerals are used to designate the same portions as are included in the first embodiment, and a detailed description of those portions is omitted herein.

According to the third embodiment, as shown in FIG. 13, partitioning device 74 includes a pair of air nozzles 102, arranged on either side of substrate 48, and air pump 104 for supplying compressed air to these nozzles 102. Each nozzle 102 is connected to hollow movable base 108 by means of supply pipe 106 formed of, e.g., metal. The proximal end portion of each nozzle 102 is connected to pipe 106 by means of flexible tube 110 so that the nozzle can be freely turned around its proximal end portion. Movable base 108, which is slidably mounted on guide rail 79 fixed to support board 68, is threadedly engaged with feed screw 82. Thus, by rotating screw 82 by means of motor 83, nozzles 102, along with movable base 108, can be vertically moved independently of substrate 48.

Air pump 104 is fixed to the rear surface of support board 68 so as to communicate with the interior of movable base 108 by means of flexible tube 112. Compressed air discharged from pump 104 is supplied to nozzles 102 through tube 112, the interior of base 108, supply pipes 106, and flexible tubes 110, and is then ejected from the tip ends of the nozzles. A monomolecular film developed on the liquid surface can be partially pushed away to expose the liquid surface by blowing the compressed air against the film.

The following is a description of a step of forming a heterostructural film on the surface of substrate 48 by using the apparatus of the third embodiment constructed in this manner.

Figure 14A:
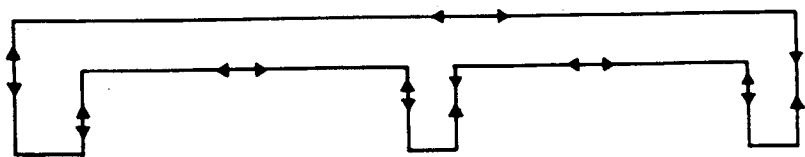
FIGS. 14A to 14J are schematic views showing process of forming a thin organic film, using the apparatus shown in FIG. 13.

FIGS. 14C to 14J show the way monomolecular films are built up. As is shown in FIGS. 14A and 14B, substrate 48 is dipped into and pulled up from liquid 18 in tanks 11, 12 and 13 in the order named, by means of drive mechanism 50 and transport mechanism 52.

Figures 14B, 14E, 14H:
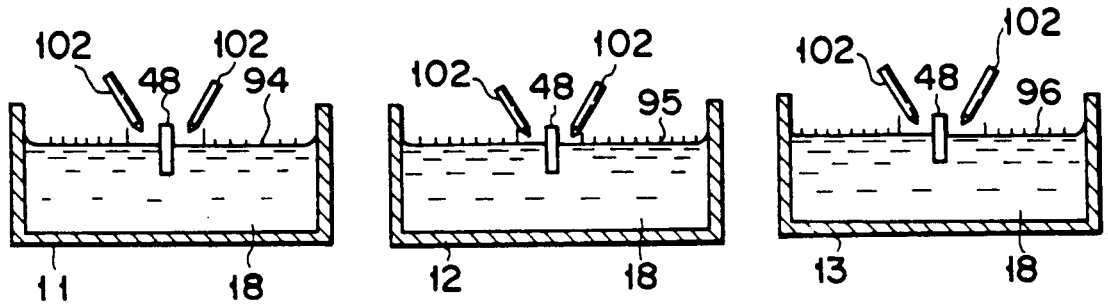
Figures 14C, 14F, 14I:
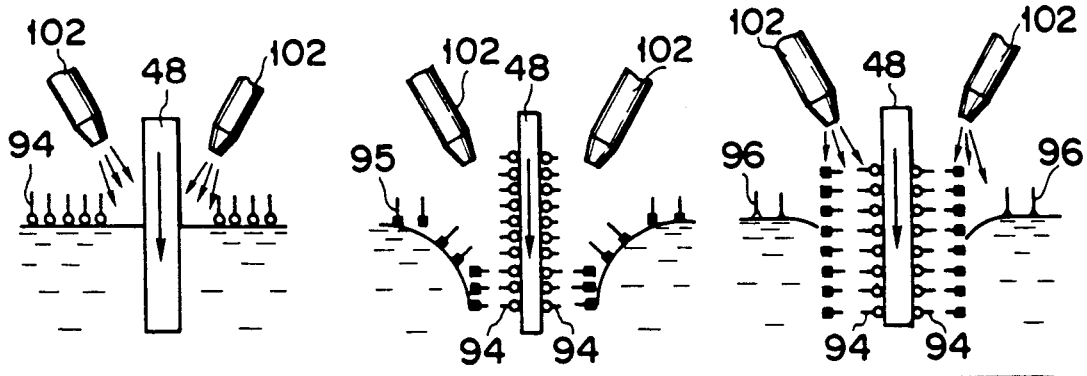

First, as is shown in FIG. 14B, substrate 48 and air nozzles 102 are transported to the region above tank 11 by transport mechanism 52. A condensed monomolecular film of molecules 94 is developed on the surface of the liquid in tank 11. Subsequently, as is shown in FIG. 14C, nozzles 102 are lowered close to the developed condensed film, and the compressed air is ejected from the nozzles toward the film. Thereupon, the condensed film is pushed away by the compressed air so that the liquid surface is partially exposed. In this state, substrate 48 is dipped into liquid 18 through the exposed liquid surface. During this process, molecules 94 cannot adhere to the surface of substrate 48.

Figures 14D, 14G, 14J:
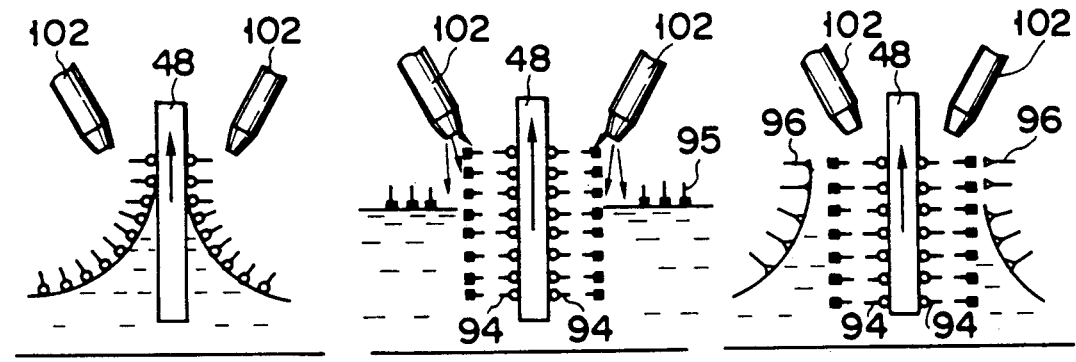

Then, as is shown in FIG. 14D, the ejection of the compressed air from nozzles 102 is stopped, whereupon molecules 94 are developed again on the exposed liquid surface. In this state, substrate 48 is drawn up from liquid 18 in tank 11 through the developed monomolecular film. Thus, monomolecular films of molecules 94 are formed on both surfaces of substrate 48 in a manner such that the hydrophilic groups of molecules 94 are in contact with the substrate. Drawn-up substrate 48, along with nozzles 102, is transported to the region above tank 12 by transport mechanism 52.

Subsequently, as is shown in FIGS. 14E and 14F, substrate 48 is dipped into liquid 18 in tank 12 through a monomolecular film of molecules 95 developed on the liquid surface. Thus, monomolecular films of molecules 95 are built up on both surfaces of substrate 48 in a manner such that the hydrophobic groups of molecules 95 are in contact with those of molecules 94 of the monomolecular films previously formed on the substrate. Thereafter, nozzles 102 are lowered, and the compressed air is ejected from the nozzles, with substrate 48 immersed in liquid 18. Thereupon, the developed monomolecular film of molecules 95 is partially pushed away by the compressed air so that part of the liquid surface is exposed. In this state, substrate 48 is drawn up from liquid 18 in tank 12 through the exposed liquid surface, as shown in FIG. 14G. During this process, the monomolecular film cannot adhere to the surface of substrate 48. Drawn-up substrate 48, along with nozzles 102, is transported to the region above tank 13 by transport mechanism 52.

Subsequently, as is shown in FIGS. 14H and 14I, nozzles 102 are lowered close to a developed condensed film of molecules 96, and the compressed air is ejected from the nozzles toward the film. Thereupon, the condensed film is pushed away by the compressed air so that the liquid surface is partially exposed. In this state, substrate 48 is dipped into liquid 18 through the exposed liquid surface. During this process, molecules 96 cannot adhere to the surface of substrate 48.

Then, as is shown in FIG. 14J, the ejection of the compressed air from nozzles 102 is stopped, whereupon molecules 96 are developed again on the exposed liquid surface. In this state, substrate 48 is drawn up from liquid 18 in tank 13 through the developed monomolecular film. Thus, monomolecular films of molecules 96 are built up on both surfaces of substrate 48 in a manner such that the hydrophilic groups of molecules 96 are in contact with the hydrophilic groups of molecules 95 previously formed on the substrate.

Figure 15:
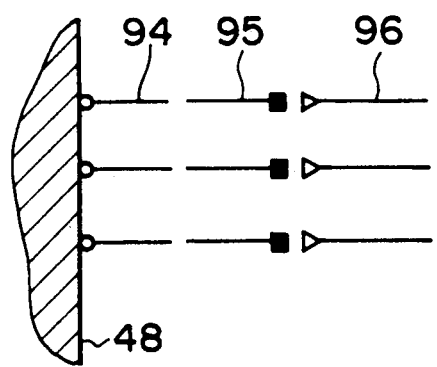
FIG. 15 is a schematic view of a thin organic film formed by the processes shown in FIGS. 14A to 14J.

FIG. 15 is an enlarged schematic view showing the heterostructural film built up on substrate 48 in the steps described above. As seen from FIG. 15, any monomolecular films can be built up in any desired directions by suitably combining the operation for the ejection of the compressed air from nozzles 102 with the ascending or descending motion of substrate 48.

According to the third embodiment constructed in this manner, the use of partitioning device 74 allows the monomolecular films to be selectively built up only when the substrate is dipped into or drawn up from the liquid. Accordingly, different monomolecular films can be stacked one by one, and their stacking direction can be freely selected. Thus, heterostructural films of various types can be formed.

In the third embodiment described above, the tip end portions of air nozzles 102 may be flared so that they have substantially the same width as substrate 48. In this case, the compressed air can be uniformly blown against the wide regions of the developed monomolecular film. Moreover, base 108, which supports nozzles 102 through the medium of supply pipes 106, need not always be movable, and may be made stationary with the same functions and effects of the third embodiment.

In the third embodiment, furthermore, the partitioning device is designed so that the region without the developed molecules is dividedly formed by blowing the compressed air against the monomolecular film. The present invention is not, however, limited to this arrangement.

For example, the molecules may be pushed away from the aforesaid region by positively charging the monomolecular film developed in the tank, and bringing a positive charge close to a desired region of the monomolecular film.

Alternatively, the aforesaid region may be divided from the developed monomolecular film by magnetizing the developed monomolecular film for the polarity of, e.g., the north pole, and bringing an electrode of the same polarity close to a desired region of the monomolecular film.

Further, molecules which repel light or ultrasonic waves may be used as the molecules to be developed, so that light or ultrasonic waves are applied to a desired region of a monomolecular film of the molecules, to push away the developed molecules developed in that region. Furthermore, heat-repellent molecules may be used as the molecules to be developed. In this case, the desired region of the monomolecular film can be divided from the remaining region by pushing away the molecules in the desired region by means of, e.g., a heater brought close to the region to be divided.

The present invention is not limited to the above embodiments and various changes and modifications can be made within the scope of the present invention. For example, although three water tanks are used in the above embodiments, the present invention is effective with at least two of them. On the other hand, four or more water tanks may be provided to develop a variety of molecules, thereby forming a heterostructural film having a complicated structure. Furthermore, an arrangement is not limited to that wherein a plurality of independent water tanks are used. For example, a single water tank may be partitioned into a plurality of independent developing regions by a partition plates or the like. Moreover, the order of water tanks, in which the substrate is transported, is not limited to that in the above embodiments but may be changed as needed. Also, arrangements of the drive device for vertically moving the substrate and of the transport mechanism for transporting the substrate can be variously modified as needed. The present invention can be applied not only to a substrate but also to a veriety of objects.

What is claimed is:

1. A method of forming thin organic films, comprising the steps of:
   preparing at least one organic molecule developing region holding a liquid;
   developing a monomolecular film of organic molecules on the surface of the liquid in the developing region; and
   dipping into or drawing up a work from the liquid through the developed monomolecular film, in a predetermined direction with respect to the molecular film, so that the monomolecular film is adhered to a surface of the work in only one of steps of dipping and drawing up the work, said step including a process of dividing that region of the developed monomolecular film through which the work is passed from the remaining region before dipping or drawing up the work, so that the adhesion of the monomolecular film to the work surface is regulated by moving the work through the divided region.

2. A method according to claim 1, wherein said work is dipped into or drawn up from said developing region, while the surface of said work is arranged substantially parallel to the monomolecular film developed in the developing region.

3. A method according to claim 1, wherein said work is dipped into or drawn up from said developing region, while the surface of said work is arranged substantially perpendicular to the monomolecular film developed in the developing region.

4. A method according to claim 3, wherein said step of developing the monomolecular film includes processes of floating organic molecules on the surface of the liquid and condensing the floating molecules, to form a monomolecular film having a predetermined surface pressure.

5. A method according to claim 3, wherein said work has two surfaces adjacent and opposite to each other, and said step of adhering the monomolecular film includes a process of dipping said work into or drawing it up from said developing region, while the surfaces of said work re situated perpendicular to the monomolecular film developed in the developing region.

6. A method according to claim 1, wherein said step of adhering the monomolecular film includes processes of partitioning, from other regions, that region of the developed monomolecular film which contacts the work, dipping the work into the liquid, through the partitioned region, so that the work is not brought into contact with the monomolecular film, opening the partitioned region while the work is dipped in the liquid, and drawing up the work from the liquid, through the developed monomolecular film, so as to adhere the mono-molecular films on the surface of the work.

7. A method according to claim 1, wherein said step of adhering the monomolecular film includes processes of dipping the work into the liquid, through the developed monomolecular film to adhere the monomolecular film on the surface of the work, partitioning, from other regions, that region of the developed monomolecular film through which the work passes, and drawing up the work through the partitioned region, so that the work is not brought into contact with the monomolecular film.

8. A method according to claim 1, wherein said step of regulating the adhesion of the monomolecular film includes dividing the region of the monomolecular film for the passage of the work from the remaining region by means of a partitioning member driven independently of the work.

9. A method according to claim 1, wherein said step of regulating the adhesion of the monomolecular film includes dividing the region of the monomolecular film for the passage of the work from the remaining region by means of a pressure of ejection of gas.

10. A method according to claim 1, which further comprises the steps of:
   preparing another organic molecule developing region holding a liquid;
   developing another monomolecular film or organic molecules different from said organic molecules on the surface of the liquid in said another developing region;
   transporting the work, which is drawn up from the developing region and having the monomolecular film thereon, to a position located above said another developing region with said another monomolecular film developed therein, through a region outside the developing regions; and dipping into or drawing up the transported work from said another developing region, in a predetermined direction with respect to said another monomolecular film, so that said another monomolecular film is adhered to the monomolecular film on the work in only one of steps of dipping and drawing up the work.

11. A method of forming thin organic films, comprising the steps of:

preparing a plurality of organic molecule developing regions divided from each other and each holding a liquid;

developing monomolecular films individually on liquid surfaces in the developing regions;

dipping into or drawing up a work from one of the developing regions with the monomolecular films developed therein, in a predetermined direction with respect to the corresponding monomolecular film, so that the monomolecular film is adhered to the surface of the work in only one of the steps of dipping and drawing up the work;

transporting the work, which is drawn up from said one developing region and having the monomolecular film thereon, to a position located above another developing region with molecular film developed therein, through a region outside the developing regions; and dipping into or drawing up the transported work from the another developing region, in a predetermined direction with respect to the another monomolecular film, so that the monomolecular film is adhered to the monomolecular film on the work in only one of steps of dipping and drawing up the work.

12. A method according to claim 11, wherein said step of developing monomolecular films includes developing monomolecular films of different organic molecules individually on the liquid surfaces in the developing regions.

13. A method according to claim 11, wherein said work is dipped into or drawn up form said developing region, while the surface of said work is arranged substantially parallel to the monomolecular film developed in the developing region.

14. A method according to claim 11, wherein said work is dipped into or drawn up from said developing region, while the surface of said work is arranged substantially perpendicular to the monomolecular film developed in the developing region.

15. A method of forming thin organic films, comprising the steps of:

preparing a plurality of organic molecule developing regions divided from each other and each holding a liquid;

developing monomolecular films of different organic molecules individually on liquid surfaces in the developing regions;

dipping into or drawing up a work from one of the developing regions with the monomolecular films developed therein, in a predetermined direction with respect to the corresponding monomolecular film, so that the monomolecular film is adhered to the surface of the work in only one of steps of dipping and drawing up the work;

transporting the work, which is drawn up from said one developing region and having the monomolecular film thereon, to a position located above another developing region with another monomolecular film developed therein, through a region outside the developing regions; and dipping into or drawing up the transported work from the another developing region, in a predetermined direction with respect to the another monomolecular film, so that the another monomolecular film is adhered to the monomolecular film on the work in only one of steps of dipping and drawing up the work.

16. A method according to claim 15, wherein said work is dipped into or drawn up from said developing region, while the surface of said work is arranged substantially parallel to the monomolecular film developed in the developing region.

17. A method according to claim 15, wherein said work is dipped into or drawn up from said developing region, while the surface of said work is arranged substantially perpendicular to the monomolecular film developed in the developing region.

* * * * *